Patented Jan. 14, 1941

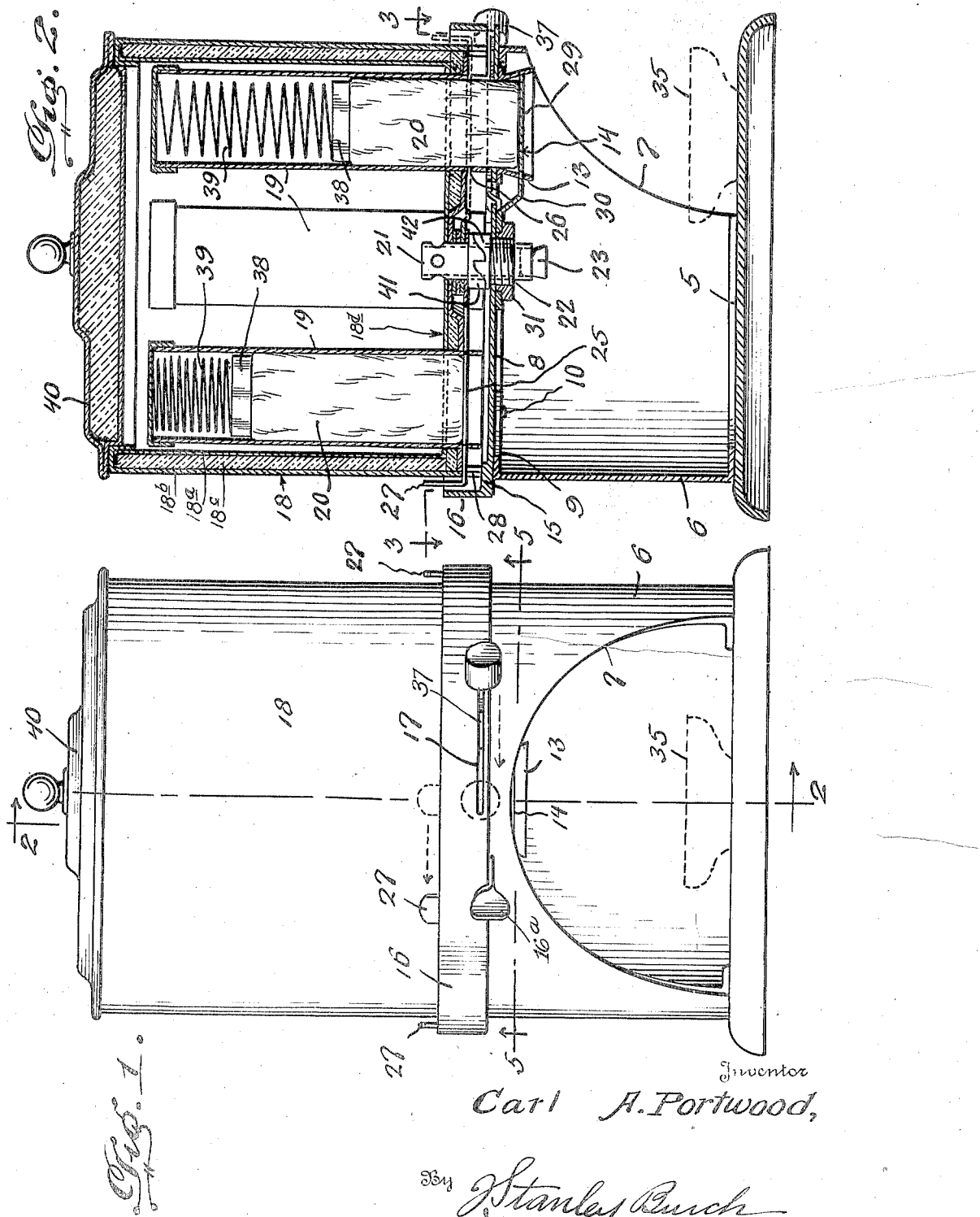

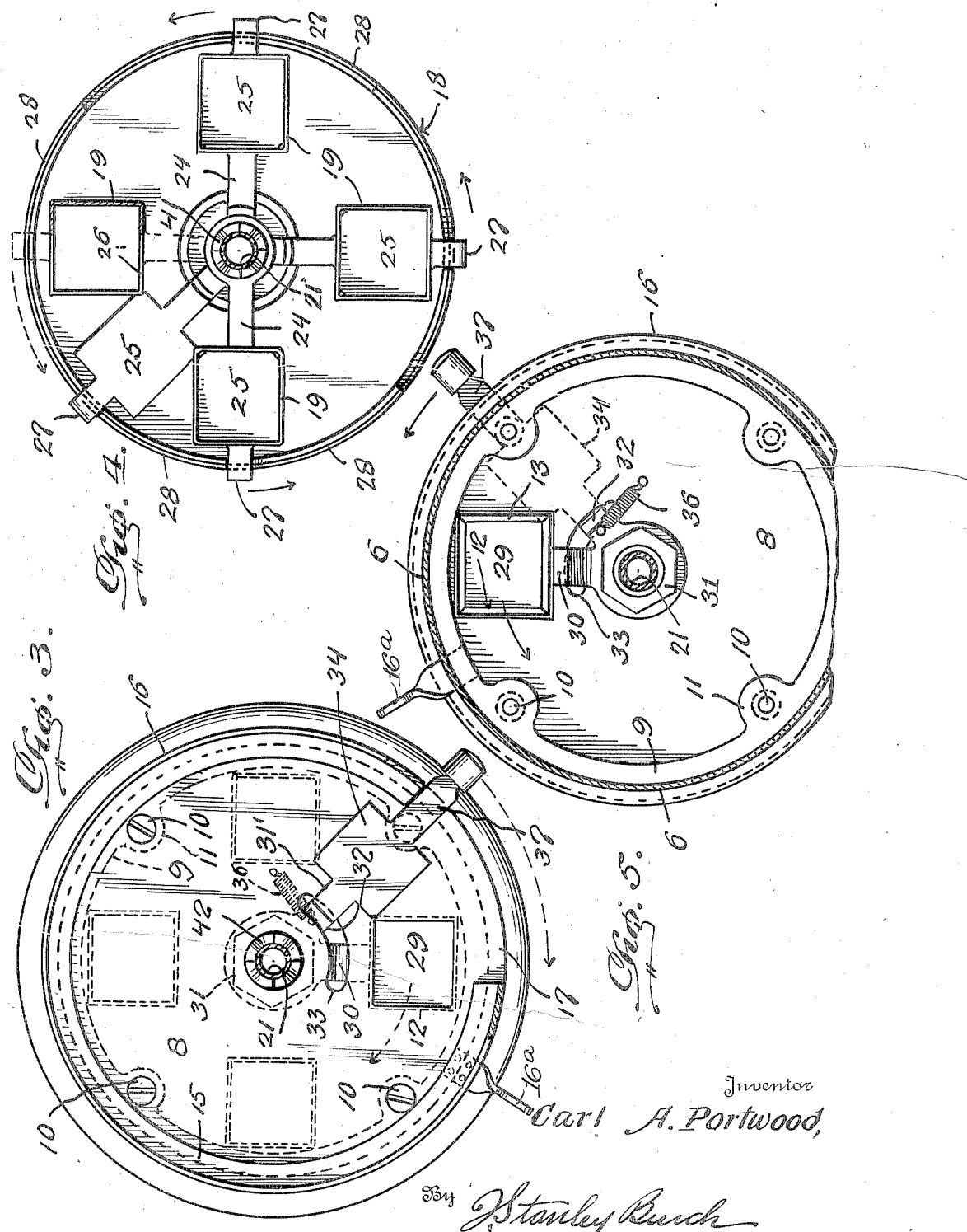

2,228,974

UNITED STATES PATENT OFFICE 2,228,974

BUTTER DISPENSER

Carl A. Portwood, Houston, Tex.

Application August 25, 1939, Serial No. 291,978

5 Claims. (Cl. 31—21)

This invention relates to butter dispensers of that type in which "pats" are cut from a slab of butter and dispensed from the machine one at a time, a plurality of the slabs of butter being contained in the machine and maintained at a desired temperature to prevent spoilage, and provision being made for permitting positioning of the slabs of butter successively so that the "pats" may be cut therefrom and dispensed.

The primary object of the present invention is to provide a durable machine of the above kind which is simple and compact in construction and highly efficient in use.

A more specific object of the present invention is to provide a machine of the above kind in which means is provided to temporarily maintain the slabs of butter elevated above and out of contact with the base while the casing carrying the dispensing tubes for the slabs of butter is rotated to bring a new slab of butter in registry with the dispensing opening of the base and in position to have the "pats" successively cut therefrom.

Other novel features of invention consist of the specific means for properly limiting partial rotation of the casing so that the successive dispensing tubes will be properly registered with the discharge opening of the base, and novel means for cutting and dispensing the "pats" from the slabs.

The present invention consists in the novel form, combination and arrangement of parts hereinafter more fully described, shown in the accompanying drawings and claimed.

In the drawings:

Figure 1 is a front elevational view of a butter dispenser constructed in accordance with the present invention.

Figure 2 is a vertical sectional view thereof taken on line 2—2 of Figure 1.

Figure 3 is a horizontal section taken on line 3—3 of Figure 2.

Figure 4 is a view similar to Figure 3 taken on the plane of line 3—3 of Figure 2, but looking upwardly or in the opposite direction; and Figure 5 is a horizontal section on line 5—5 of Figure 1.

Referring in detail to the drawings, the present invention includes a base having a bottom wall 5, a circular vertical wall 6 which is cut away at the front of the machine as at 7 to permit the insertion of a butter plate to catch the portions or "pats" of butter as the same are cut and dispensed, and a top wall 8. As shown, the vertical wall 6 may be provided at the top with an inturned annular flange 9 upon which the top wall 8 is seated and to which said top wall is secured by means of bolts 10 passing through the top wall 8 and through ears 11 of said flange 9. The top wall 8 is provided at the front of the machine with a dispensing opening 12, and secured to the underside of the wall 8 in registry with this opening 12 is a discharge spout 13 horizontally slotted at 14 for a purpose which will presently become apparent. The top wall 8 of the base is preferably upwardly thickened at its margin as indicated at 15 and is provided with an annular upwardly projecting marginal flange 16 having a horizontal elongated slot 17 at the front of the machine. A handle 18a is fixed to and projects outwardly from the top wall 8 of the base.

A cylindrical casing 18 is disposed above the base and is of well known double-walled insulated construction including an inner wall 18a and an outer wall 18b with insulation 18c therebetween, as clearly shown in Figure 2. The outer wall 18b of this casing extends below the bottom 18d of the latter and rests upon the thickened marginal portion 16 of the top 8 of the base, as is also shown clearly in Figure 2. Arranged within the casing 18 at equally spaced points and adjacent the cylindrical wall of said casing 18 are a plurality of vertical butter dispensing tubes 19, each adapted to receive a slab 20 of butter from which the "pats" are to be cut and dispensed. The lower end portions of these butter dispensing tubes extend through openings in the bottom 18d of the casing 18 and are suitably rigidly secured in place with the lower ends of said tubes 19 slightly spaced above the portion of the top wall 8 disposed directly therebeneath. The bottom wall of casing 18 has a central opening in which is secured the upper end portion of a drain tube 21. Also, the top wall 8 of the base has a central opening in which is secured a bushing 22 through which the drain tube 21 extends and in which said drain tube is freely rotatable. The lower end of the drain tube 21 may be suitably closed by means of a stopper 23 or the like, and it will be understood that the casing 18 is adapted to receive a suitable refrigerant whereby the dispensing tubes 19 and the slabs of butter 20 contained therein are maintained in a cold condition so as to prevent softening or melting thereof. Water or liquid of the refrigerant may be drained from the casing 18 from time to time through the drain tube 21.

Pivoted on the drain tube 21 directly beneath the bottom of the casing 18 are the inner ends of arms 24, carrying closure plates 25 at their outer ends. Each of the projecting lower ends of the dispensing tubes 19 is horizontally slotted as at 26 so as to receive the associated closure plate 25, whereby the slab of butter 20 in the associated despensing tube 19 is temporarily maintained in an elevated position above the top wall 8 of the base and out of contact with the latter, as shown with respect to one of the slabs in Figure 2. One closure plate 25 is provided for each dispensing tube as shown, and extending outwardly from each closure plate 25 is an angular handle 27 that projects outwardly through a horizontally elongated slot in the projecting lower edge portion of the outer wall of casing 18 as at 28 and which then extends upwardly above the flange 16 of the wall 8 outside the casing 18 within convenient reach of the user. Obviously, when a dispensing tube has been registered with the discharge opening 12 of the top wall 8, the associated closure plate 25 may be swung so as to move out of the bottom of said dispensing tube 19 and permit the slab of butter in the latter dispensing tube to lower through the opening 12 as shown with respect to the right hand slab of butter in Figure 2. This lowering of the slab is properly limited by means of a supporting plate 29 carried by the outer end of a downwardly offset arm 30 journaled at its inner end on the reduced upper portion of a nut member 31 threaded on the bushing 22 and between the larger lower end portion of said nut member 31 and the top wall 8 of the base. The supporting plate 29 is movable into and out of the slot 14 of the discharge spout 13. Another arm 31' is rigid with the inner end of arm 30 and extends outwardly in diverging relation to the latter, and this arm 31' is offset upwardly as at 32 and extends through an arcuate slot 33 in the top wall 8 of the base. Carried by the outer end of arm 31' and movable on the upper surface of the top wall 8 is a plate-like cutter 34 which may be swung horizontally between the lower end of the dispensing tube 19 alined with the opening 12 and the top wall 8 so as to cut the portion of the slab of butter projecting below the top wall 8 and thereby form the "pat" of butter to be dispensed. As the supporting plate 29 is rigid with the arm 31' which carries the cutter plate 34, said supporting plate 29 will be swung out of the slot 14 at the same time that the cutter plate 34 is moved to cut the "pat" of butter from the slab, thereby permitting said "pat" of butter to drop out of the discharge spout 13 into the plate 35 positioned on the bottom wall 5 of the base directly beneath said discharge spout 13. At the same time, the butter plate 34 supports the remainder of the slab of butter until the supporting plate 29 is returned to supporting position within the slot 14 and the cutter plate 34 is returned to a position at one side of the opening 12 as shown in Figure 3. The supporting plate 29 and cutter plate 34 may be normally pieldingly maintained in the latter position by means of a helical tension spring 36 connected at one end to the arm 31' and at the other end to the underside of top wall 8 of the base as shown clearly in Figures 3 and 5, the movement of the cutter plate 34 for cutting the "pat" of butter from the slab and for simultaneously moving the supporting plate 29 out of the slot 14 being manually effected against the action of said spring 36 by means of a handle 37 extending outwardly from the cutter plate 34 and through the slot 17 of flange 16. As will be apparent, the outer end of handle 37 may be readily grasped, along with the handle 18a, so as to swing the plates 29 and 34 in the manner described for the purpose set forth. The downward feeding of the slabs of butter may be positively effected by means of a follower plate 38 disposed upon the top of the slab of butter within the associated dispensing tube 19 and urged downwardly by means of a helical compression spring 39 interposed between the lid of the dispensing tube 19 and the follower 38. Also, casing 18 has a removable cover 40 which permits ready access to the interior of casing 18 so that the refrigerant may be replenished when desired and so that the dispensing tubes 19 may be opened for the insertion of fresh slabs of butter whenever desired.

It will be seen that the casing 18 is freely rotatable upon the base so as to bring the successive dispensing tubes and slabs of butter in registry with the dispensing opening 12. In order to facilitate proper regitration of the successive dispensing tubes 19 with the opening 12, as well as to prevent retrograde rotation of the casing 18, I provide cooperating ratchet members 41 and 42, respectively secured on the intermediate portion of drain tube 21 between the bottom of casing 18 and top wall 8, and on the bushing 22. Thus, the ratchet member 41 rotates with the drain tube 21 and casing 18 while the ratchet member 42 is stationary. These ratchet members have cooperating ratchet-like teeth which interengage to perform the function stated. Casing 18 is simply manually rotated in the proper direction, at which time the inclined sides of the teeth of ratchet member 41 ride over those of ratchet member 42 until the new alinement of teeth is effected, whereupon the casing 18 will lower with the teeth of the ratchet members snugly engaged and with the outer wall of casing 18 resting on the margin of the top wall 8 of the base as shown in Figure 2. With the ratchet members engaged, the coacting flat or vertical faces of the ratchet teeth prevent retrograde rotation of the casing 18, as will be apparent.

From the above description, it is believed that the construction and operation of the present machine will be readily apparent. The construction is simple, compact and durable, and the form and arrangement of parts is such as to insure efficient operation and convenience of use. However, while I have herein shown and described the preferred embodiment of the invention, it will be apparent that minor changes in details of construction may be resorted to without departing from the spirit and scope of the invention as claimed.

What I claim as new is:

1. A butter dispenser comprising a stationary supporting base having a flat top wall provided with a discharge opening, a casing mounted to rotate on the base and adapted to contain a cooling medium, a plurality of vertical dispensing tubes arranged in the casing and adapted to contain slabs of butter to be sliced, said dispensing tubes extending through the bottom of the casing and having open lower ends adapted to successively register with the discharge opening when the casing is rotated, horizontally swinging closure plates associated with the lower ends of the dispensing tubes for normally maintaining the slabs of butter elevated above the top wall of the base, means to protrude the lower end of a slab of butter through said discharge opening when the dispensing tube thereof is registered with the discharge opening and the corresponding closure plate is swung from beneath said slab, a horizontally swinging supporting plate arranged beneath the top of the base for limiting the protrusion of said slab through the discharge opening, and a horizontal cutter plate movable in a plane between the top of the base and the lower end of the dispensing tube registered with said discharge opening for cutting a portion from the protruding lower end of the slab of butter and for supporting the remainder of the slab while the said supporting plate is swung to one side of the discharge opening for permitting the cut portion of butter to drop into a receiving receptacle disposed below said top wall.

2. A butter dispenser comprising a stationary supporting base having a flat top wall provided with a discharge opening, a casing mounted to rotate on the base and adapted to contain a cooling medium, a plurality of vertical dispensing tubes arranged in the casing and adapted to contain slabs of butter to be sliced, said dispensing tubes extending through the bottom of the casing and having open lower ends adapted to successively register with the discharge opening when the casing is rotated, horizontally swinging closure plate associated with the lower ends of the dispensing tubes for normally maintaining the slabs of butter elevated above the top wall of the base, means to protrude the lower end of a slab of butter through said discharge opening when the dispensing tube thereof is registered with the discharge opening and the corresponding closure plate is swung from beneath said slab, a horizontally swinging supporting plate arranged beneath the top of the base for limiting the protrusion of said slab through the discharge opening, and a horizontal cutter plate movable in a plane between the top of the base and the lower end of the dispensing tube registered with said discharge opening for cutting a portion from the protruding lower end of the slab of butter and for supporting the remainder of the slab while the said supporting plate is swung to one side of the discharge opening for permitting the cut portion of butter to drop into a receiving receptacle disposed below said top wall, said supporting plate and said cutter plate being rigidly connected for operation in unison whereby the supporting plate is swung to one side of the discharge opening when the cutter plate is swung to cut the portion from the lower end of the slab of butter.

3. A butter dispenser comprising a stationary supporting base having a flat top wall provided with a discharge opening, a casing mounted to rotate on the base and adapted to contain a cooling medium, a plurality of vertical dispensing tubes arranged in the casing and adapted to contain slabs of butter to be sliced, said dispensing tubes extending through the bottom of the casing and having open lower ends adapted to successively register with the discharge opening when the casing is rotated, horizontally swinging closure plates associated with the lower ends of the dispensing tubes for normally maintaining the slabs of butter elevated above the top wall of the base, means to protrude the lower end of a slab of butter through said discharge opening when the dispensing tube thereof is registered with the discharge opening and the corresponding closure plate is swung from beneath said slab, a horizontally swinging supporting plate arranged beneath the top of the base for limiting the protrusion of said slab through the discharge opening, a horizontal cutter plate movable in a plane between the top of the base and the lower end of the dispensing tube registered with said discharge opening for cutting a portion from the protruding lower end of the slab of butter and for supporting the remainder of the slab while the said supporting plate is swung to one side of the discharge opening for permitting the cut portion of butter to drop into a receiving receptacle disposed below said top wall, said supporting plate and said cutter plate being rigidly connected for operation in unison whereby the supporting plate is swung to one side of the discharge opening when the cutter plate is swung to cut the portion from the lower end of the slab of butter, and yieldable means normally moving the cutter plate and supporting plate to a position wherein the supporting plate is registered with the discharge opening in supporting position and the cutter plate is moved to a position at one side of said discharge opening for permitting the protrusion of the slab through said discharge opening.

4. A butter dispenser comprising a stationary supporting base having a flat top wall provided with a discharge opening, a casing mounted to rotate on the base and adapted to contain a cooling medium, a plurality of vertical dispensing tubes arranged in the casing and adapted to contain slabs of butter to be sliced, said dispensing tubes extending through the bottom of the casing and having open lower ends adapted to successively register with the discharge opening when the casing is rotated, horizontally swinging closure plates associated with the lower ends of the dispensing tubes for normally maintaining the slabs of butter elevated above the top wall of the base, means to protrude the lower end of a slab of butter through said discharge opening when the dispensing tube thereof is registered with the discharge opening and the corresponding closure plate is swung from beneath said slab, a horizontally swinging supporting plate arranged beneath the top of the base for limiting the protrusion of said slab through the discharge opening, a horizontal cutter plate movable in a plane between the top of the base and the lower end of the dispensing tube registered with said discharge opening for cutting a portion from the protruding lower end of the slab of butter and for supporting the remainder of the slab while the said supporting plate is swung to one side of the discharge opening for permitting the cut portion of butter to drop into a receiving receptacle disposed below said top wall, said top wall of the base having a central opening a drain tube for the casing protruding centrally from the bottom of the latter and journaled in the opening of said top wall, and cooperating ratchet members carried by said top wall of the base and the drain tube for facilitating successive registration of the dispensing tubes with the discharge opening when the casing is rotated.

5. A butter dispenser comprising a stationary supporting base having a flat top wall provided with a discharge opening, a casing mounted to rotate on the base and adapted to contain a cooling medium, a plurality of vertical dispensing tubes arranged in the casing and adapted to contain slabs of butter to be sliced, said dispensing tubes extending through the bottom of the casing and having open lower ends adapted to successively register with the discharge opening when the casing is rotated, horizontally swinging closure plates associated with the lower ends of the dispensing tubes for normally maintaining the slabs of butter elevated above the top wall of the base, means to protrude the lower end of a slab of butter through said discharge opening when the dispensing tube thereof is registered with the discharge opening and the corresponding closure plate is swung from beneath said slab, a horizontally swinging supporting plate arranged beneath the top of the base for limiting the protrusion of said slab through the discharge opening, a horizontal cutter plate movable in a plane between the top of the base and the lower end of the dispensing tube registered with said discharge opening for cutting a portion from the protruding lower end of the slab of butter and for supporting the remainder of the slab while the said supporting plate is swung to one side of the discharge opening for permitting the cut portion of butter to drop into a receiving receptacle disposed below said top wall, said casing having a vertical wall projecting below the bottom of the casing and resting on the top wall of the base to sustain the casing in a position wherein the lower ends of the dispensing tubes are spaced from said top wall of the base, said projecting lower portion of the vertical wall of the casing being slotted, and handles projecting outwardly from said closure plates through the slots of said vertical wall of the casing.

CARL A. PORTWOOD.